United States Patent
Akselrod et al.

(10) Patent No.: US 10,727,601 B1
(45) Date of Patent: Jul. 28, 2020

(54) SIDELOBE SUPPRESSION IN METASURFACE DEVICES

(71) Applicant: Lumotive, LLC, Bellevue, WA (US)

(72) Inventors: Gleb M. Akselrod, Bellevue, WA (US); Prasad Padmanabha Iyer, Renton, WA (US)

(73) Assignee: Lumotive, LLC, Bellevue, WA (US)

( * ) Notice: Subject to any disclaimer, the term of this patent is extended or adjusted under 35 U.S.C. 154(b) by 0 days.

(21) Appl. No.: 16/829,850

(22) Filed: Mar. 25, 2020

Related U.S. Application Data

(60) Provisional application No. 62/934,520, filed on Nov. 13, 2019.

(51) Int. Cl.
*H01Q 15/00* (2006.01)
*H01Q 3/26* (2006.01)

(52) U.S. Cl.
CPC ....... *H01Q 15/0053* (2013.01); *H01Q 3/2617* (2013.01); *H01Q 15/002* (2013.01); *H01Q 15/0086* (2013.01)

(58) Field of Classification Search
CPC .. H01Q 3/26; H01Q 3/44–3/46; H01Q 15/00; H01Q 19/10; G02F 1/29; G02B 6/122
See application file for complete search history.

(56) References Cited

U.S. PATENT DOCUMENTS

| | | | |
|---|---|---|---|
| 2015/0162658 A1* | 6/2015 | Bowers | H01Q 3/44 342/385 |
| 2018/0109002 A1* | 4/2018 | Foo | H01Q 15/0066 |
| 2019/0173191 A1* | 6/2019 | Kamali | H01Q 1/425 |

* cited by examiner

*Primary Examiner* — Dameon E Levi
*Assistant Examiner* — Hasan Z Islam
(74) *Attorney, Agent, or Firm* — Phillips Winchester; Justin K. Flanagan

(57) ABSTRACT

A transceiver system may include first and second metasurfaces, such as radio frequency (RF) metasurfaces or optically reflective tunable liquid crystal metasurfaces (LCMs). In one specific example, a transmit LCM may be tuned by a controller to steerably reflect incident optical radiation at a target transmit steering angle. A laser or other optical radiation source may transmit optical radiation to the transmit LCM at a first angle of incidence. The controller may tune the second tunable LCM to steerably receive optical radiation at a target receive steering angle corresponding to the target transmit steering angle. The received optical radiation may be reflected at a second angle of incidence to a detector.

25 Claims, 15 Drawing Sheets

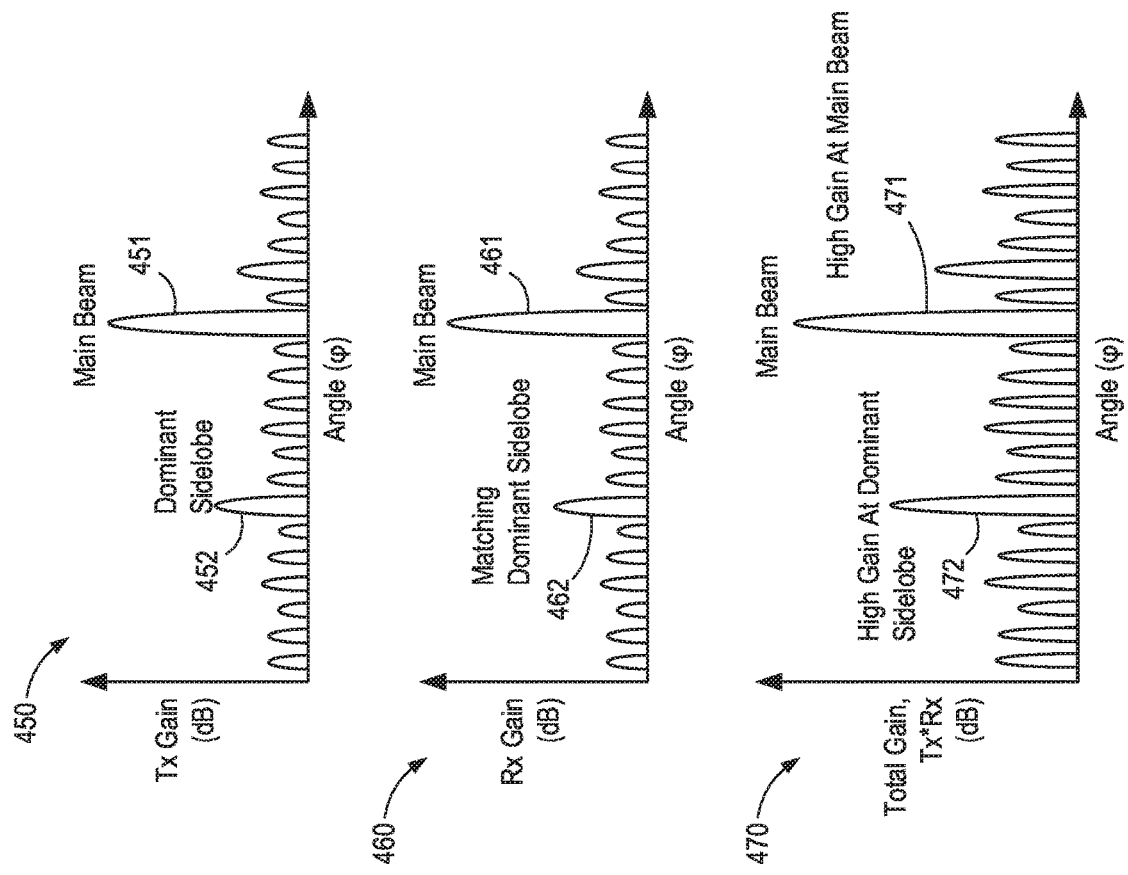
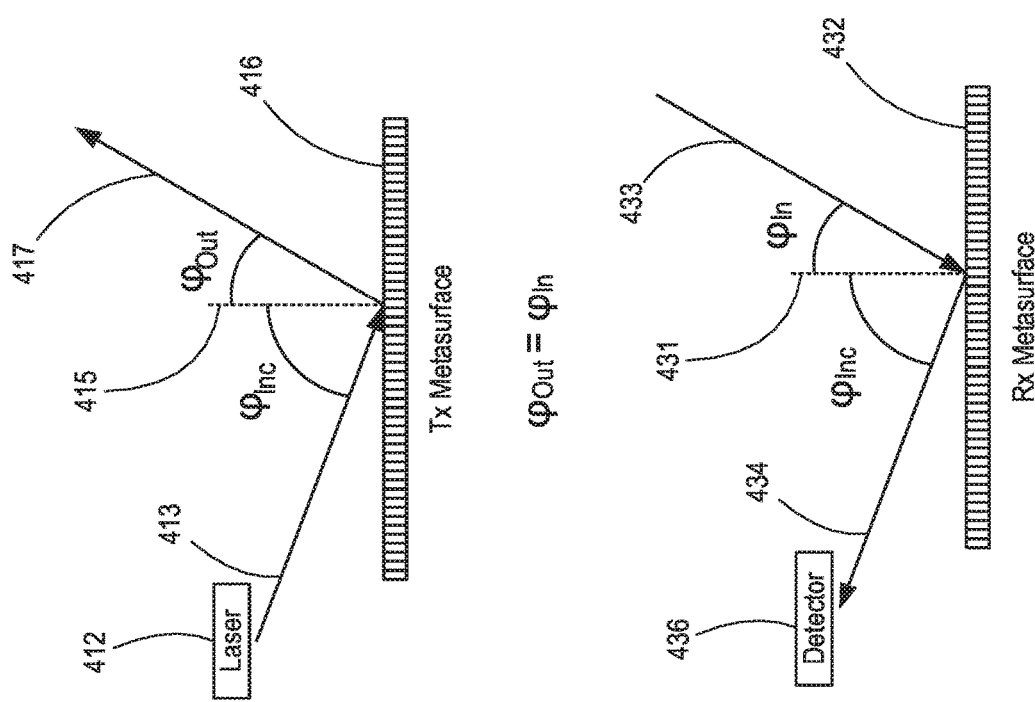
FIG. 4B
FIG. 4A

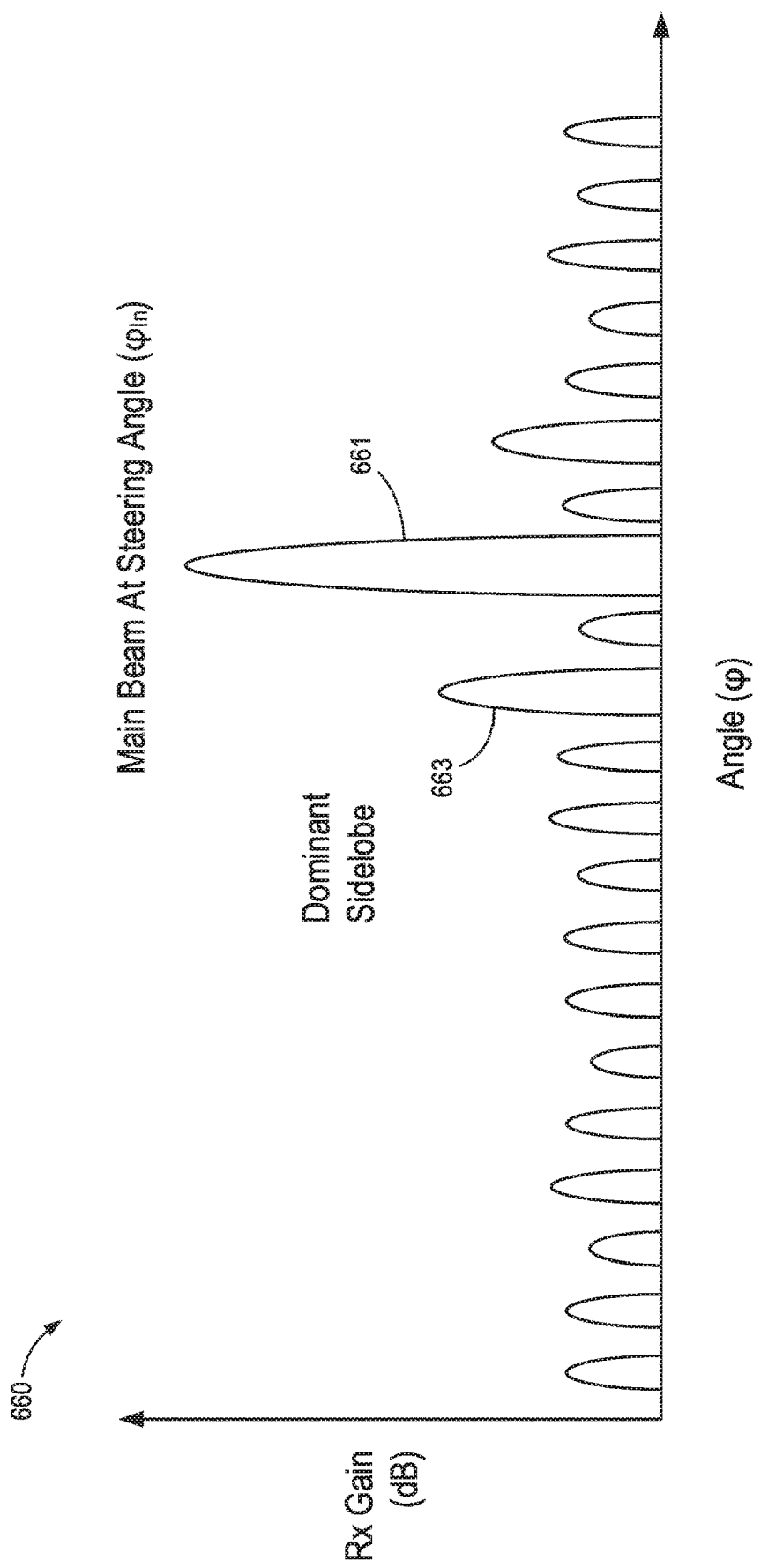

SIDELOBE SUPPRESSION IN METASURFACE DEVICES

RELATED APPLICATIONS

This application claims priority under 35 U.S.C. § 119 to U.S. Provisional Patent Application No. 62/934,520, filed on Nov. 13, 2019, titled "Side-Lobe Suppression In Optical Metasurface Devices," which application is hereby incorporated by reference in its entirety to the extent it is not inconsistent herewith. This Application also incorporates U.S. Provisional Patent Application No. 62/852,007 titled "Waveguide-Integrated Tunable Liquid Crystal Metasurface Devices," filed on May 23, 2019, by reference in its entirety to the extent it is not inconsistent herewith.

TECHNICAL FIELD

This disclosure relates to optical resonators, liquid crystal-based metasurfaces, radio frequency (RF) metasurfaces, and optical waveguides. Specifically, this disclosure relates to antenna systems for transmitting and receiving radiation, including RF and optical radiation.

BRIEF DESCRIPTION OF THE DRAWINGS

FIG. 4A illustrates block diagrams of transmit and receive metasurfaces with matched angles of incidence.

FIG. 4B illustrates graphs of the gain of the transmit and receive metasurfaces relative to the steering angles and the combined effective gain.

FIG. 6D illustrates a graph of the gain of the receive metasurface of FIG. 6B, according to one embodiment.

DETAILED DESCRIPTION

Figure 1A:
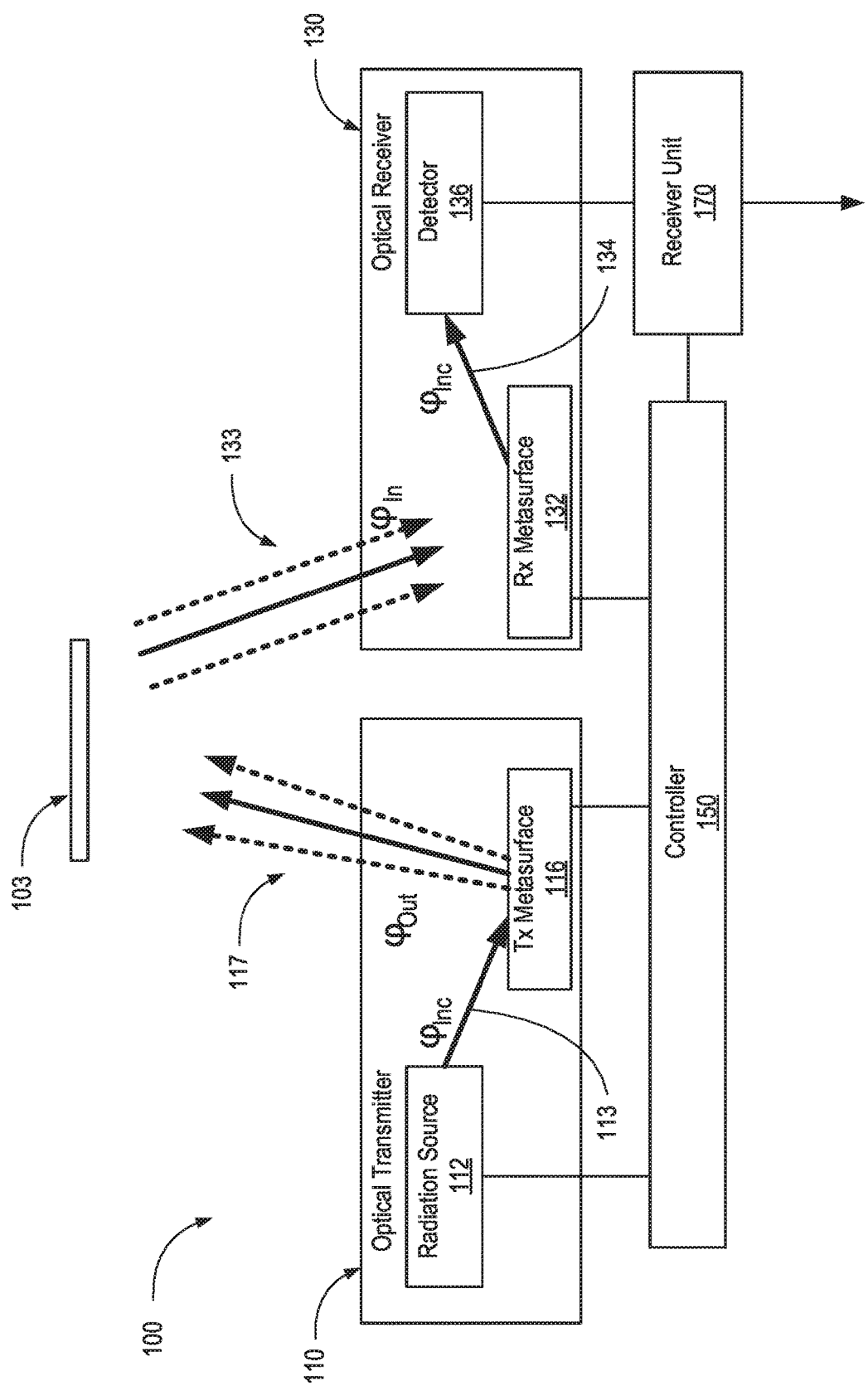
FIG. 1A illustrates a block diagram of an example solid-state optical transceiver system, according to one embodiment.

Solid-state metasurface transceiver systems are described herein that include transmit and receive metasurfaces with offset angles of incidence. The systems, methods, and configurations described herein may be applied to a wide variety of metasurface devices, including radio frequency (RF) metasurface devices and optical metasurface devices. For example, the presently described systems and methods may be utilized in conjunction with optical metasurface devices used for light detection and ranging (lidar), wireless data transfer, wireless power transfer (RF or Optical), optical imaging, and the like. In some examples, transmit and receive metasurfaces with offset angles of incidence may be used in combination with waveguide-integrated tunable liquid crystal metasurface devices.

An optical metasurface device may include a laser to emit optical radiation (e.g., continuous or pulsed optical radiation) at an operating wavelength or wavelengths. The laser emits pulses of collimated optical radiation to an optical metasurface, such as a tunable optically reflective liquid crystal metasurface (LCM) or other transmit reconfigurable-metasurface. The transmit metasurface steerably reflects and beamforms the optical radiation. The transmit metasurface may be configured for one-dimensional beam steering or two-dimensional beam steering.

In various embodiments, a laser or other optical radiation source transmits optical radiation to a first metasurface (e.g., an optically reflective tunable metasurface), such as an LCM, at a first angle of incidence with respect to the planar surface of the first metasurface. The angle of incidence may be selected to be outside of the available beam steering angles of the first metasurface. The first metasurface reflects (or, in some embodiments refracts) the optical radiation at a selected transmit steering angle to a distant location. One or more objects in the distance may rebound the optical radiation back toward the system. A second metasurface, such as an optically reflective tunable metasurface or other type of metasurface, may steerably receive the rebounded optical radiation at a receive steering angle corresponding to the selected transmit steering angle.

The second metasurface may reflect the received optical radiation at a second angle of incidence to a detector. The second angle of incidence may be intentionally selected to be different than the first angle of incidence such that for a given steering angle, the first and second metasurfaces will have different or asymmetric radiation patterns. The angles and gain of sidelobes associated with a metasurface are based, at least in part, on the angle of incidence at which the metasurface reflects (or, in some embodiments refracts) optical radiation from a laser (for transmitting) or to a detector (for receiving).

Accordingly, by selecting different or offset angles of incidence for a transmit metasurface and a receive metasurface, the transmit and receive metasurfaces will have asymmetric radiation patterns even when they are tuned to the same steering angle. The asymmetric radiation patterns have overlapping main beams at the steering angle, but the sidelobes associated with the main beams are offset from one another. The total gain of the system is very high at the steering angle where the main beams overlap but relatively low at the sidelobe angles.

In some specific example embodiments, the first angle of incidence and the second angle of incidence may be selected to offset a dominant sidelobe of the first optically reflective tunable metasurface with respect to a dominant sidelobe of the second optically reflective tunable metasurface. For example, the difference between the first angle of incidence and the second angle of incidence may correspond to one diffraction order of the first and second optically reflective tunable metasurfaces.

In some embodiments, optical metasurfaces, such as tunable, optically reflective LCMs, include one or more optically reflective surfaces. An optically reflective surface may be, for example, a metal surface selected to reflect optical radiation within a specific bandwidth. A large number of optical resonant antennas may be positioned on the reflective surface. The optical resonant antennas may have sub-wavelength features and be arranged with sub-wavelength spacing. For example, the individual optical resonant antennas and the spacings therebetween may be less than one-half of a wavelength.

In various embodiments, liquid crystal may be positioned around the optical resonant antennas, as a layer on top of the optical resonant antennas, and/or as part of the optical resonant antennas. A digital or analog controller may selectively apply varying voltage differentials across the liquid crystal within optical field regions of each of the optical resonant antennas. The voltage controller may apply a voltage differential bias pattern, such as a grating pattern (e.g., a blazed grating pattern), to the metasurface to attain a target beam steering angle.

A one-dimensional voltage bias pattern may be applied to liquid crystal within the optical field regions of a one-dimensional array of optical resonant antennas to effectuate one-dimensional beam steering. A two-dimensional voltage bias pattern may be applied to liquid crystal within the optical field regions of a two-dimensional array of optical resonant antennas to effectuate two-dimensional beam steering and/or spatial beamforming. One-dimensional beam steering, two-dimensional beam steering, and spatial beamforming are generally referred to herein as being encompassed by the term "beamforming."

The metasurface may have a default reflection angle or reflection pattern based on the reflective properties of the optically reflective surface, the unbiased optical resonant antennas, and the unbiased liquid crystal. In various embodiments, biasing the liquid crystal changes the reflection phase of the optical radiation proximate the associated optical resonant antennas. Each different voltage pattern across the metasurface corresponds to a different reflection phase pattern. With a one-dimensional array of optical resonant antennas, each different reflection phase pattern corresponds to a different steering angle in a single dimension. With a two-dimensional array of optical resonant antennas, each different reflection phase pattern may correspond to a different two-dimensional beam steering angle. Alternatively, each different reflection pattern may be used to effectuate a unique spatial beam form.

A wide variety of shapes, sizes, materials, configurations, and the like may be utilized. Optical resonant antennas may, for example, be formed as metal rails extending from the optically reflective surface. In some embodiments, a deposit of liquid crystal may fill part of each channel between adjacent optical resonant antennas. In other embodiments, the liquid crystal may be formed as a layer on top of the optical resonant antennas that fills the channels therebetween.

A voltage controller may apply a voltage pattern to the metal rails to bias the liquid crystal associated therewith to attain a target reflection phase pattern. In embodiments in which the optically reflective surface is metal and the optical resonant antennas are metal, a dielectric or another insulator may separate the metal surface and the optical resonant antennas. The voltage controller may be connected to the metal rails via contacts around a perimeter of the metasurface or via insulated thru-bores in the metal surface.

Copper is an example of a metal suitable and cost-effective for infrared bandwidths commonly used for lidar, such as 850-nanometer, 905-nanometer, or 1550-nanometer lidar systems. Copper may also be used for a variety of other operational wavelengths, and alternative metals (e.g., gold, silver, aluminum, etc.) and various dielectrics and metal-coated dielectrics are known to be highly reflective at various wavelengths. It is appreciated that some materials, as known in the art, may be preferred for visible wavelengths, other materials may be more suitable for ultraviolet wavelengths, and still other materials may be more suitable for infrared wavelengths.

To provide a specific example, an optically reflective LCM may include a planar copper reflector covered with silicon dioxide. Between 10,000 and 1,000,000 copper rails extend from the silicon dioxide-covered copper reflector. The copper rails may be subdivided into subsets of copper rails. Each subset of copper rails includes between 100 and 100,000 copper rails. The tunable metasurface may include a number of electrical contacts equal to the number of copper rails in each subset.

For example, each subset may include 1,000 rails and the tunable, optical metasurface may include 50 subsets for a total of 50,000 metal rails. The tunable, optical metasurface may include 1,000 electrical contacts. Each electrical contact may be connected to one rail within each subset. Thus, in the examples above, each of the 1,000 electrical contacts would be connected to 50 different metal rails—one metal rail in each of the 50 subsets.

Liquid crystal deposited between the metal rails may be secured via an optically transparent cover (e.g., glass). The application of a voltage pattern to the 1,000 electrical contacts via a voltage controller results in a voltage differential bias pattern being applied to the liquid crystal that changes the local reflection phase thereof. A beam steering controller selects a voltage pattern corresponding to a reflection phase pattern of a target beam steering angle. By modifying the applied voltage, incident optical radiation can be steered in one direction. Similar embodiments using columns or pillars instead of elongated metal rails may be used to allow for two-dimensional beam steering or spatial beamforming.

Various combinations of the embodiments and features described above may be used to manufacture and/or operate a solid-state lidar transmitter, receiver, or transceiver system. The transceiver system, according to various embodiments, may include a first tunable, optically reflective LCM for transmitting laser light and a second tunable, optically reflective LCM for receiving laser light reflected by distant objects (rebounded light). The distance to the distant objects can be calculated by measuring the time-of-flight of the transmitted and rebounded light.

The optical transceiver systems described herein may be used for lidar with a laser diode light source for transmissions, such as a laser diode emitting optical radiation at standardized wavelengths of 905 nanometers or 1550 nanometers. Various other wavelengths may be utilized with the systems and methods described herein, including visible wavelengths, sub-infrared wavelengths, and infrared wavelengths. The lidar system may include a receiver to reflect rebounded optical radiation to a receiving sensor (such as an avalanche photodiode array) from a target steering angle or beam shape (e.g., corresponding to the transmitted steering angle or beam shape).

It is appreciated that the metasurface technologies described herein may incorporate, enhance, or otherwise complement prior advancements in surface scattering antennas, such as those described in U.S. Patent Publication No. 2012/0194399, which publication is hereby incorporated by reference in its entirety. Additional elements, applications, and features of surface scattering antennas that feature a reference wave or feed wave are described in U.S. Patent Publication Nos. 2014/0266946, 2015/0318618, 2015/0318620, 2015/0380828, 2015/0162658 and 2015/0372389, each of which is hereby incorporated by reference in its entirety. Specific descriptions of optical resonant antenna configurations and feature sizes are described in U.S. patent application Ser. Nos. 16/357,288, 15/900,676, 15/900,683, and 15/924,744, each of which is hereby incorporated by reference in its entirety to the extent they are not inconsistent herewith.

Many prior advancements in surface scattering antennas have focused on relatively low frequencies (e.g., microwave or other radio frequency bands). The presently described embodiments support optical bandwidths and are therefore suitable for lidar and other optical-based sensing systems. For example, the optical systems and methods described herein operate in the sub-infrared, mid-infrared, high-infrared, and/or visible-frequency ranges (generally referred to herein as "optical"). Given the feature sizes needed for sub-wavelength optical resonant antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

Many of the examples illustrated and described herein refer to optical metasurfaces and, more specifically, to optically reflective tunable metasurfaces. However, it is appreciated that the presently described systems and methods are equally applicable to other types of metasurfaces, including reflective and transmissive metasurfaces configured for use with optical radiation, microwave radiation, RF radiation, and/or other specific bands of electromagnetic radiation. Similarly, the presently described systems and methods may be used in conjunction with tunable (e.g., reconfigurable) metasurfaces and/or static metasurfaces.

Thus, the presently described systems and methods are generally understood to encompass a wide variety of metasurface antenna systems including RF antenna systems and optical antenna systems, such as lidar systems. In such embodiments, a metasurface antenna system includes a radiation source to transmit electromagnetic radiation (e.g., optical or RF) to a first metasurface at a first angle of incidence defined relative to the first metasurface. The first metasurface steerably transmits the incident radiation at a transmit steering angle to distant objects. At least some of the transmitted radiation rebounds from the distant objects back to the antenna system. A second metasurface steerably receives the rebounded radiation at a receive steering angle that corresponds to the transmit steering angle. A detector detects the radiation reflected by the second metasurface at a second angle of incidence defined with respect to the second metasurface. Side lobe suppression occurs because the first angle of incidence is different than the second angle of incidence.

Variations and specific embodiments encompassed by the preceding general description may incorporate tunable metasurface devices adapted for specific bands of electromagnetic radiation. For example, the presently described systems and methods for side lobe suppression using offset angles of incidence may be utilized in conjunction with many of the embodiments described in the patent applications and publications incorporated by reference above.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any of the embodiments described herein may be combined with any combination of other embodiments described herein. The various permutations and combinations of embodiments are contemplated to the extent that they do not contradict one another.

As used herein, a computing device, system, subsystem, module, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once. As previously noted, descriptions and variations described in terms of transmitters are equally applicable to receivers, and vice versa.

FIG. 1A illustrates a block diagram of an example solid-state optical transceiver system 100, according to one embodiment. An optical transmitter 110 may include a radiation source 112, such as a laser or other optical radiation source. Various optical components, such as lenses, mirrors, collimating devices, waveguides, and the like may be utilized in conjunction with radiation source 112 to direct optical radiation 113 to a transmitter metasurface 116 at a first angle of incidence, $\varphi_{inc}$. The transmitter metasurface 116 may be, for example, an optically reflective tunable metasurface such as an LCM. The controller 150 may apply voltages or otherwise tune the transmitter metasurface 116 to steerably reflect the incident optical radiation 113 at a transmit steering angle, $\varphi_{out}$, as transmitted optical radiation 117. The transmitted optical radiation 117 may rebound off distant objects, such as distant object 103. The rebounded optical radiation 133 may be received by a receiver metasurface 132 at a receive steering angle, $\varphi_{in}$, corresponding to the transmit steering angle, $\varphi_{out}$.

The feature sizes, angles, and distances illustrated in the block diagram of the system 100 are not proportional or spatially accurate. For example, distant object 103 is shown relatively close to the system 100 due to limitations of the block diagram. In some instances, the distant object 103 may be much farther away than the spacing between the optical transmitter 110 and the optical receiver 130, such that the transmit steering angle, $\varphi_{out}$, and the receive steering angle, $\varphi_{in}$, are effectively the same angle or even exactly the same angle.

The received optical radiation 134 is reflected by the metasurface 132 at the same, first angle of incidence, $\varphi_{inc}$, to a detector 136. The angle of incidence, $\varphi_{inc}$, at which the transmit metasurface 116 and receive metasurface 132 operate are a function of the manufacturing, configuration, and/or tuning of the metasurfaces themselves. In some embodiments, metasurfaces may be interchangeably used as transmit metasurfaces and receive metasurfaces, in which case they may operate with the same angle of incidence, $\varphi_{inc}$. The detector 136 may comprise, for example, a photodiode array such as an array of avalanche photodiodes (APDs) or an array of single-photon avalanche diodes (SPADs). A receiver unit 170 may process the power levels detected by the detector 136. The system 100 may be used for power delivery, data transfer, imaging, sensing, and the like. In some embodiments, the system 100 may be or be part of a lidar system.

Figure 1B:
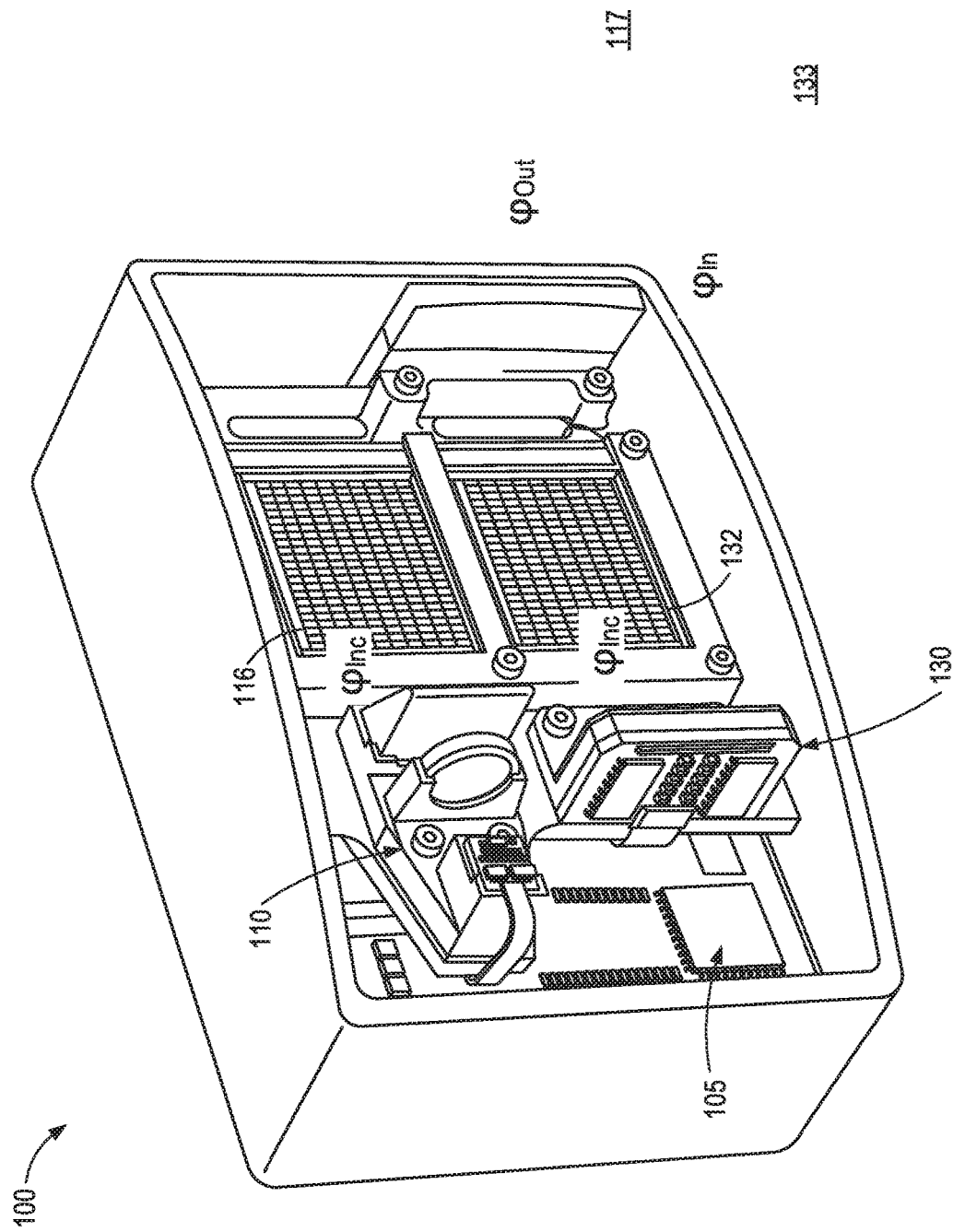
FIG. 1B illustrates an example of a solid-state lidar system, according to one embodiment.

FIG. 1B illustrates an example solid-state optical transceiver system 100 with a transmit metasurface 116 and a receive metasurface 132 for one-dimensional beam steering. An optical radiation source 110 (e.g., a 905-nanometer laser diode or a 1550-nanometer laser diode) illuminates the transmit metasurface 116. The optical transceiver system 100 may include collimating and/or focusing optical elements. The optical radiation from the optical radiation source 110 is incident on the transmit metasurface 116 at a first angle of incidence, $\varphi_{inc}$.

A controller or control circuitry 105 may tune the transmit metasurface 116 to dynamically reflect that optical radiation from the optical radiation source 110 as transmitted optical radiation 117 at a transmit steering angle. The transmitted optical radiation 117 may be rebounded from distant objects and returned as received optical radiation 133 by the receive metasurface 132. The controller may tune the receive metasurface 132 to receive optical radiation at a receive steering angle corresponding to the transmit steering angle.

The receive metasurface 132 may reflect the received optical radiation 133 to a detector 130 to detect power levels of the received optical radiation 133 at the receive steering angle. The detector 130 may, for example, comprise a photodiode array, an array of APDs, or an array of SPADs.

Figure 2:
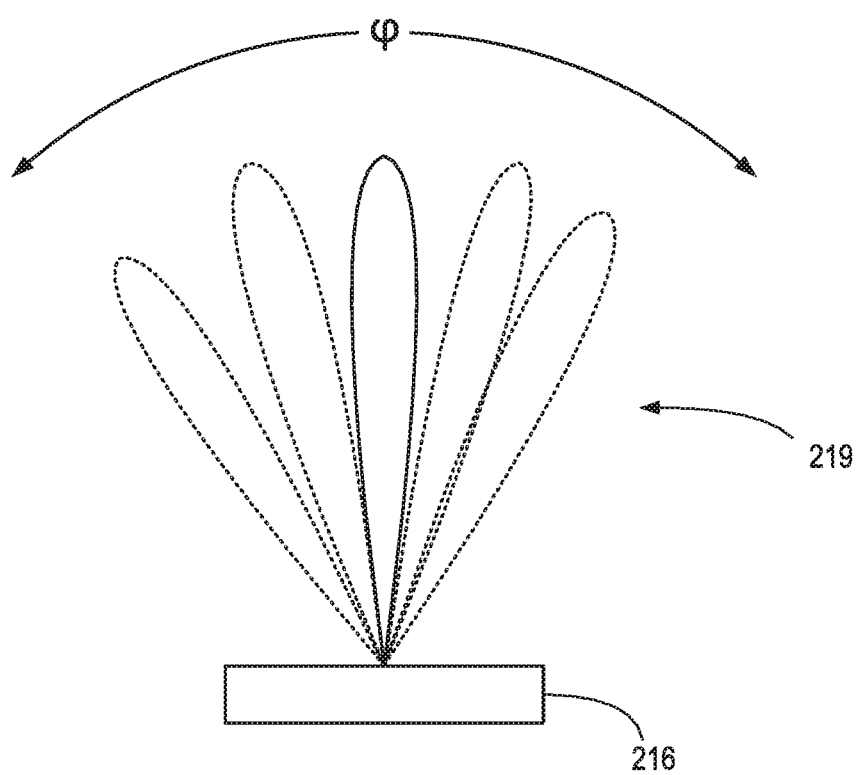
FIG. 2 illustrates an example of steerable beamforms generated by an optical metasurface device.

FIG. 2 illustrates an example diagram of steerable beamforms 219 generated by an optical metasurface device 216. The optical metasurface device 216, such as an optically reflective tunable LCM, may facilitate one-dimensional beam steering to a target steering angle, cp.

Figure 3:
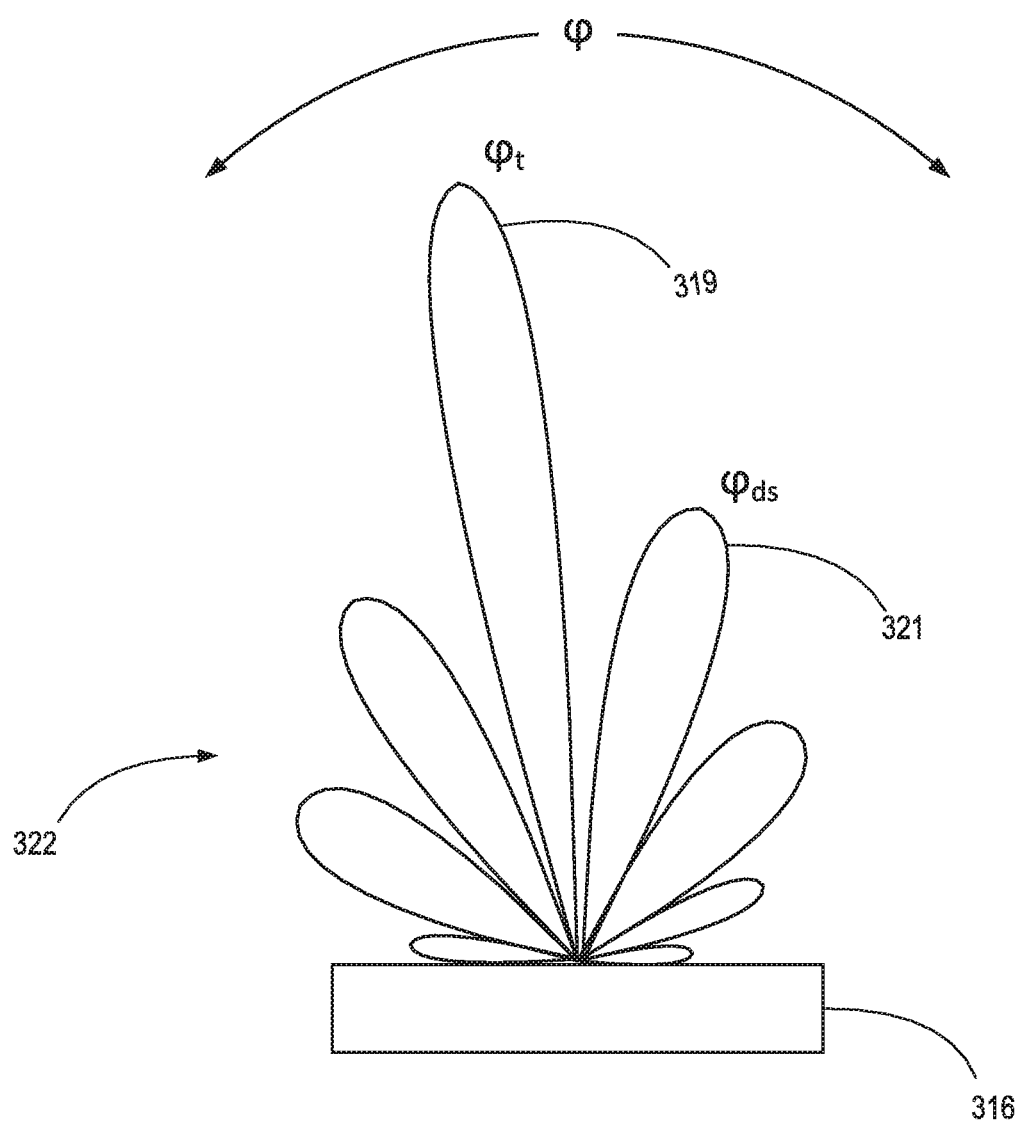
FIG. 3 illustrates an example of a steerable main beam and unintended sidelobes generated by an optical metasurface device.

FIG. 3 illustrates an example diagram of a metasurface device 316 with a main beam 319 steered to a target steering angle, $\varphi_t$, of approximately −15°. The illustration also shows a representation of some sidelobes 322 associated with the specific steering angle, $\varphi_t$, including a dominant sidelobe 321 at an angle, $\varphi_{ds}$.

FIG. 4A illustrates a block diagram of a transmit metasurface 416 and a receive metasurface 432 with matched angles of incidence, $\varphi_{inc}$. As illustrated, a laser 412 may transmit optical radiation 413 at an angle of incidence, $\varphi_{inc}$, to the transmit metasurface 416. The angle of incidence, $\varphi_{inc}$, may be defined with respect to the transmit metasurface 416, such as with respect to a line 415 orthogonal to the planar surface of the transmit metasurface 416. The transmit metasurface 416 may be tuned by a controller to beamform the optical radiation 417 at a transmit steering angle, $\varphi_{out}$.

The optical radiation 417 may be rebounded by distant objects and ultimately received as received optical radiation 433 at a receive steering angle, $\varphi_{in}$, that corresponds to the transmit steering angle, $\varphi_{out}$ (e.g., substantially equal to or equal to the transmit steering angle, $\varphi_{out}$). The transmit and receive steering angles may be collectively referred to as a target steering angle, $\varphi_{target}$. The receive metasurface 432 is beamformed by a controller to receive the optical radiation 433 for reflection 434 at the angle of incidence, $\varphi_{inc}$, to a detector 436. Again, the angle of incidence, $\varphi_{inc}$, may be defined with respect to the receive metasurface 432, such as with respect to a line 431 orthogonal to the planar surface of the receive metasurface 432

FIG. 4B illustrates graphs of the gain of the transmit and receive metasurfaces relative to the steering angles and the combined effective gain. The transmit graph 450 illustrates the gain of the optical radiation transmitted at the main beam 451 at a target steering angle. The transmit graph 450 also includes the gain of the optical radiation transmitted at a dominant sidelobe 452. In many instances, optical radiation transmitted at the angle of the dominant sidelobe 452 is unintended/undesirable and serves to decrease the efficiency of the power transmitted as part of the main beam 451 at the target steering angle.

The receive graph 460 illustrates the gain of the received optical radiation at the main beam 461 at the target steering angle. As described in conjunction with FIG. 4A, the transmit metasurface 416 and the receive metasurface 432 operate at the same angle of incidence, $\varphi_{inc}$. Thus, the radiation patterns generated by each of the transmit and receive metasurfaces are substantially identical for any given steering angle, including the target steering angle. Accordingly, the receive graph 460 illustrates a matching dominant sidelobe 462 at the same angle as the dominant sidelobe 452 of the transmit metasurface shown in graph 450.

The combined gain graph 470 illustrates the combined gain of the transmit metasurface 416 and the receive metasurface 432. As illustrated, high gain is achieved at the main beam 471 at the target steering angle. However, relatively high gain is also present at the dominant sidelobe 472 because the dominant sidelobe 452 of the transmit metasurface 416 and the dominant sidelobe 462 of the receive metasurface 432 are aligned. Optical radiation detected by the detector 436 at the angle of the dominant sidelobe 472 is unintended and/or undesirable and may, for example, decrease the effective signal-to-noise ratio of the optical radiation received at the target steering angle.

Figure 5A:
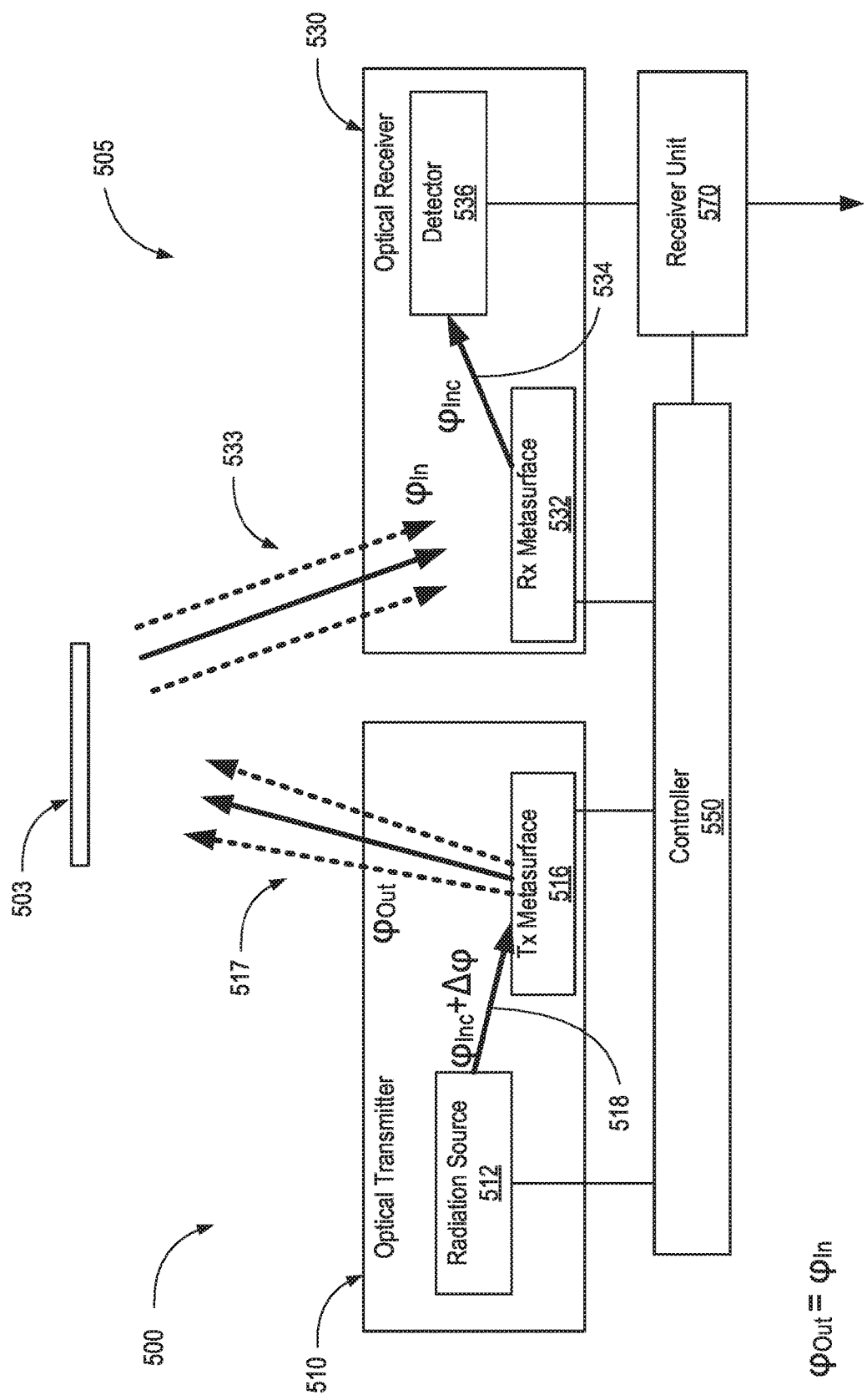
FIG. 5A illustrates a block diagram of an example solid-state lidar system with offset angles of incidence, according to various embodiments.

FIG. 5A illustrates a block diagram of an example of a solid-state optical radiation system 500 with offset angles of incidence, according to various embodiments. As illustrated, an optical transmitter 510 may include a radiation source 512, such as a laser or other optical radiation source. Various optical components, such as lenses, mirrors, collimating devices, waveguides, and the like may be utilized in conjunction with radiation source 512 to direct optical radiation 518 to a transmitter metasurface 516 at a first angle of incidence, $\varphi_{inc}+\Delta\varphi$. The transmitter metasurface 516 may be, for example, an optically reflective tunable metasurface such as an LCM. The controller 550 may apply voltages or otherwise tune the transmitter metasurface 516 to steerably reflect the incident optical radiation 518 at a transmit steering angle, $\varphi_{out}$, as transmitted optical radiation 517. The transmitted optical radiation 517 may rebound off distant objects, such as distant object 503. The rebounded optical radiation 533 may be received by a receiver metasurface 532 at a receive steering angle, $\varphi_{in}$, corresponding to the transmit steering angle, $\varphi_{out}$.

As described in conjunction with FIG. 1A, the feature sizes, angles, and distances illustrated in block diagram of the system 500 are not proportional or spatially accurate. For example, the distant object 503 may be much farther away than the spacing between the optical transmitter 510 and the optical receiver 530, such that the transmit steering angle, $\varphi_{out}$, and the receive steering angle, $\varphi_{in}$, may be the same angle, effectively the same angle, or angles differing by an amount corresponding to the spacing between the transmit metasurface 516 and receive metasurface 532.

The received optical radiation 534 is reflected by the receive metasurface 532 at a different, second angle of incidence, $\varphi_{inc}$, to a detector 536. As described herein, the angle of incidence at which the transmit metasurface 516 and receive metasurface 532 operate affects the radiation pattern generated for a given steering angle. Specifically, the sidelobes associated with a given target steering angle of the transmit metasurface 516 operating at the first angle of incidence, $\varphi_{inc}+\Delta\varphi$, are at different angles than the sidelobes associated with the same target steering angle of the receive metasurface 532 operating at the second angle of incidence, $\varphi_{inc}$.

Similar to other embodiments, the detector 536 may comprise, for example, a photodiode array such as an array of APDs or an array of SPADs. A receiver unit 570 may process the power levels detected by the detector 536. The system 500 may be used for any of a wide variety of purposes, including data transfer, imaging, sensing, and lidar.

Figure 5B:
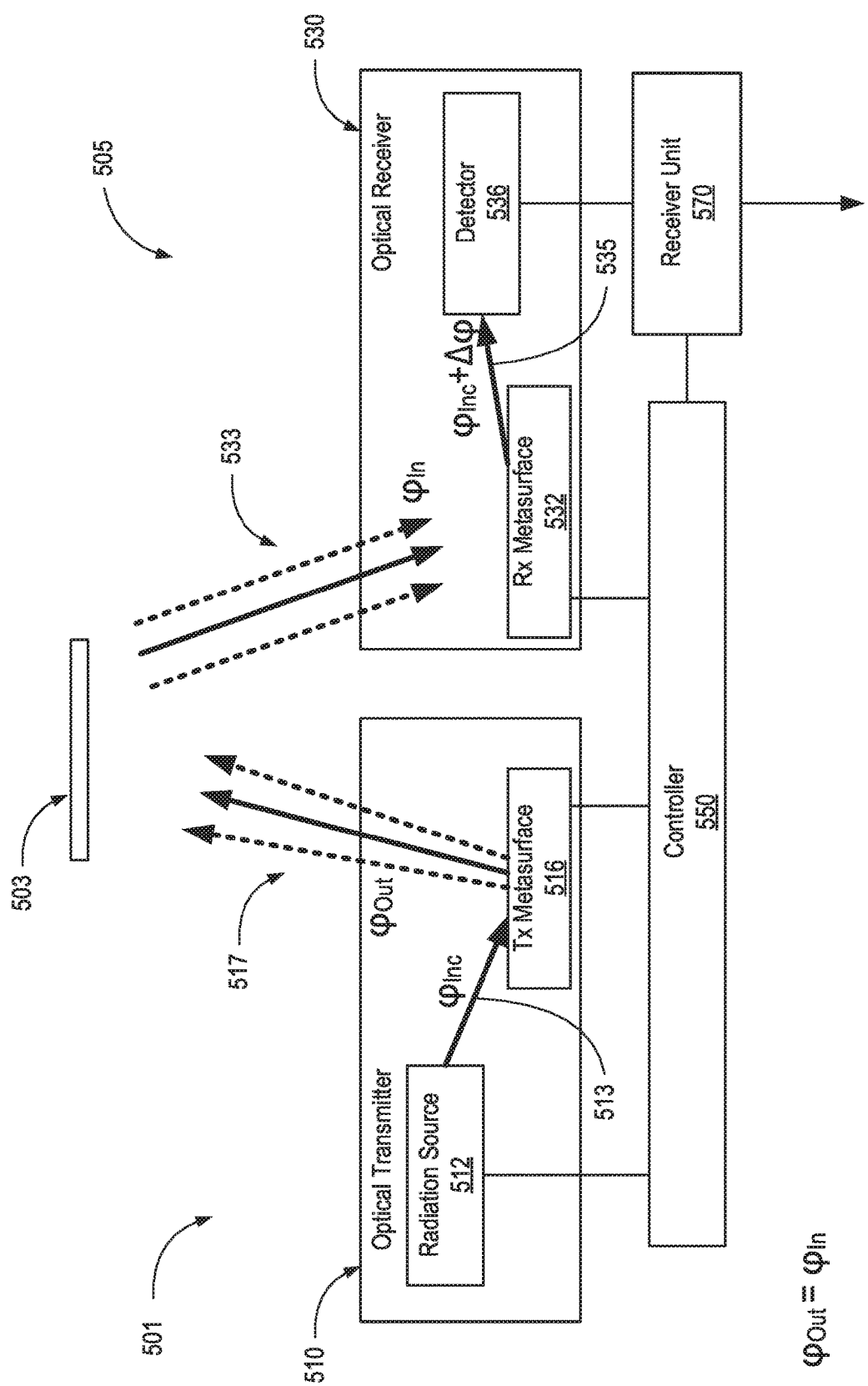
FIG. 5B illustrates a block diagram of another example of a solid-state optical radiation system with offset angles of incidence, according to various embodiments.

FIG. 5B illustrates a block diagram of another example of a solid-state optical radiation system 501 with offset angles of incidence, according to other embodiments. The illustrated embodiment is similar to the embodiment described in conjunction with FIG. 5A. However, a notable difference is that the radiation source 512 transmits optical radiation to the transmit metasurface 516 at a first angle of incidence, $\varphi_{inc}$, while the receiver metasurface 532 reflects light to the detector 536 at a lower, second angle of incidence, $\varphi_{inc}+\Delta\varphi$. FIGS. 5A and 5B illustrate that in many instances it does not matter which of the transmit and receive angles of incidence is greater. Instead, as long as the two angles of incidence are sufficiently different from one another (e.g., offset by one diffraction order of the metasurfaces), asymmetric radiation patterns are generated for the same target steering angle.

Figure 6A:
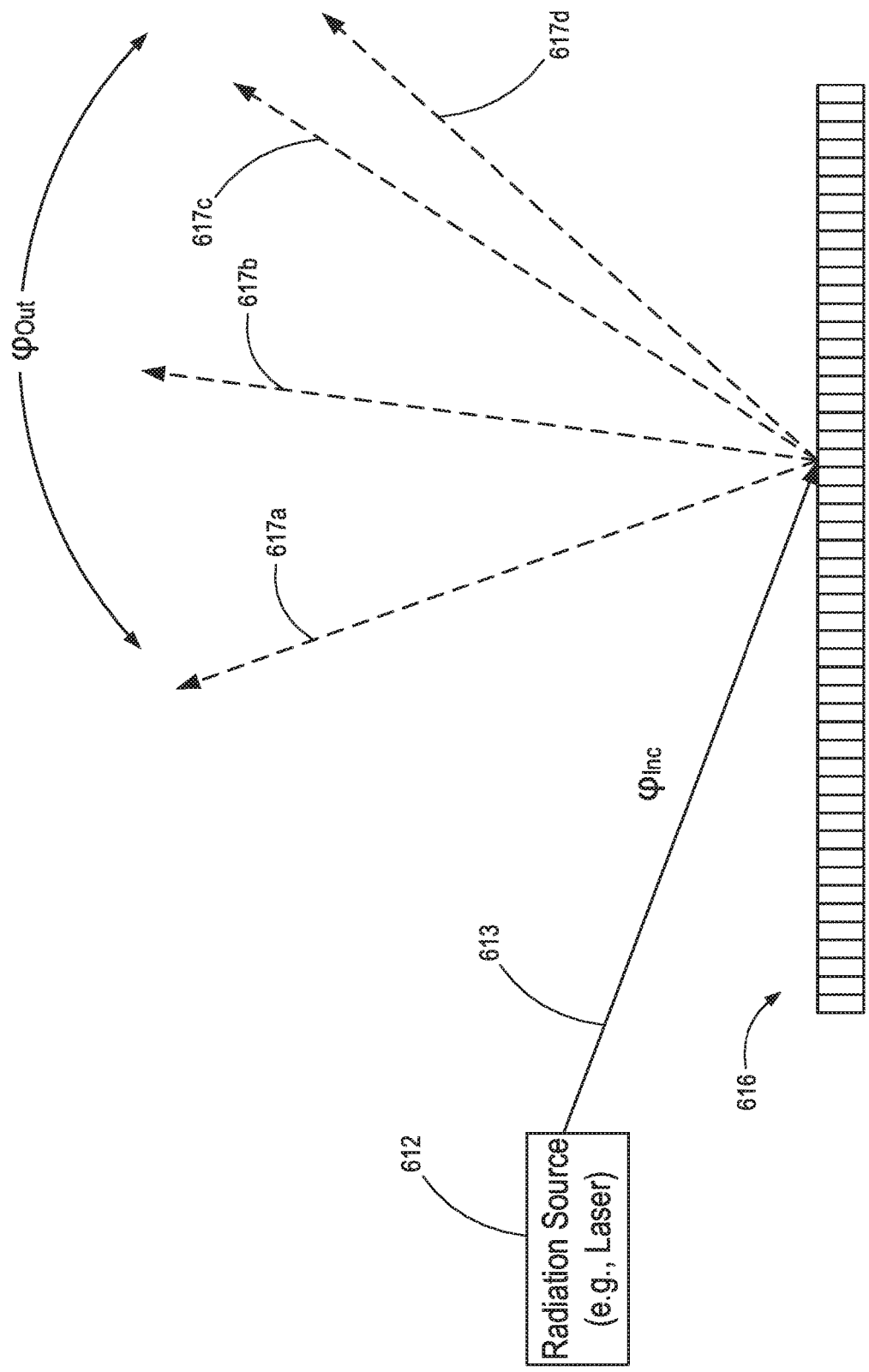
FIG. 6A illustrates a block diagram of a transmit metasurface with a first angle of incidence, according to one embodiment.
Figure 6B:
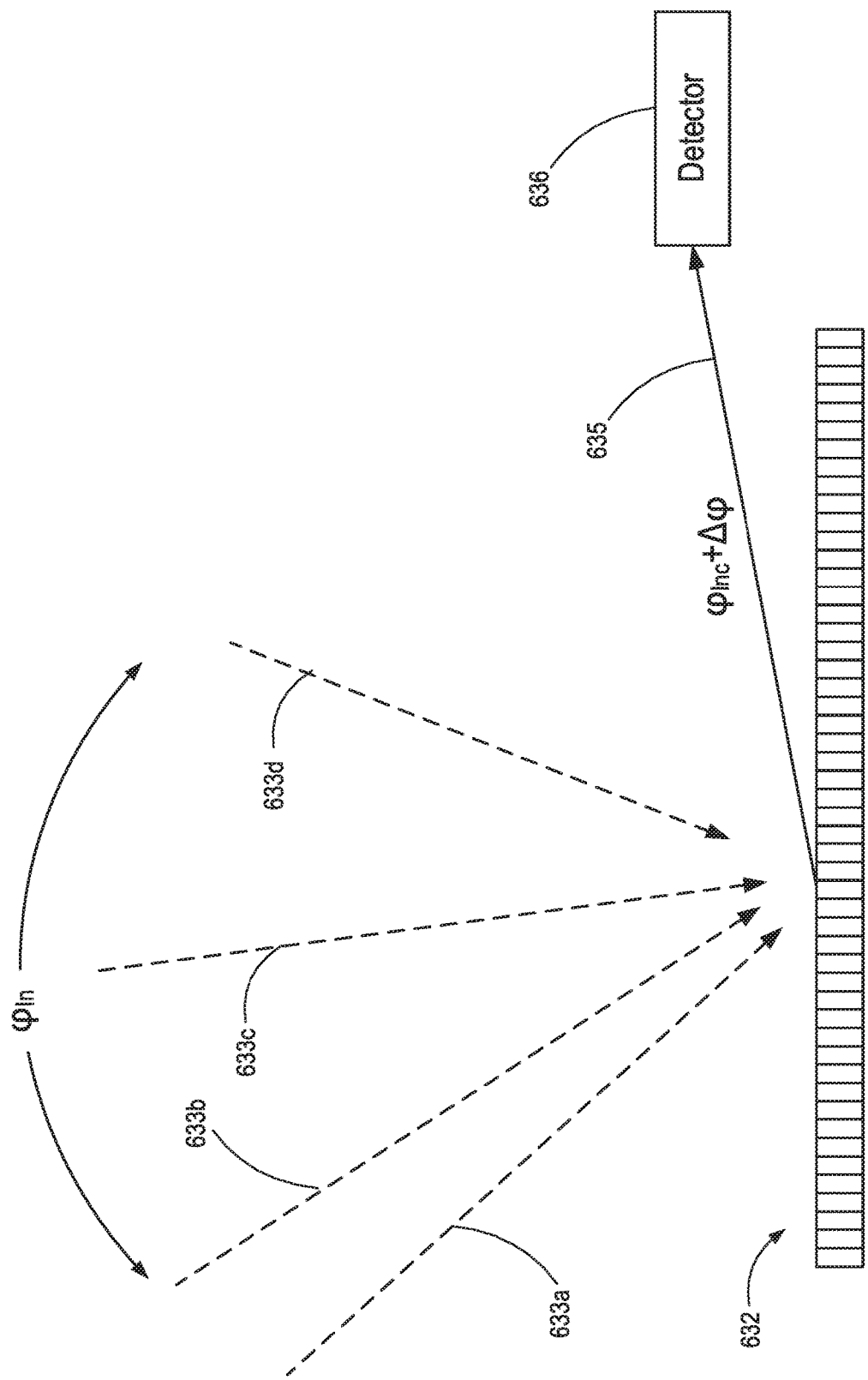
FIG. 6B illustrates a block diagram of a receive metasurface with a second angle of incidence offset from the first angle of incidence of the transmit metasurface, according to one embodiment.
Figure 6C:
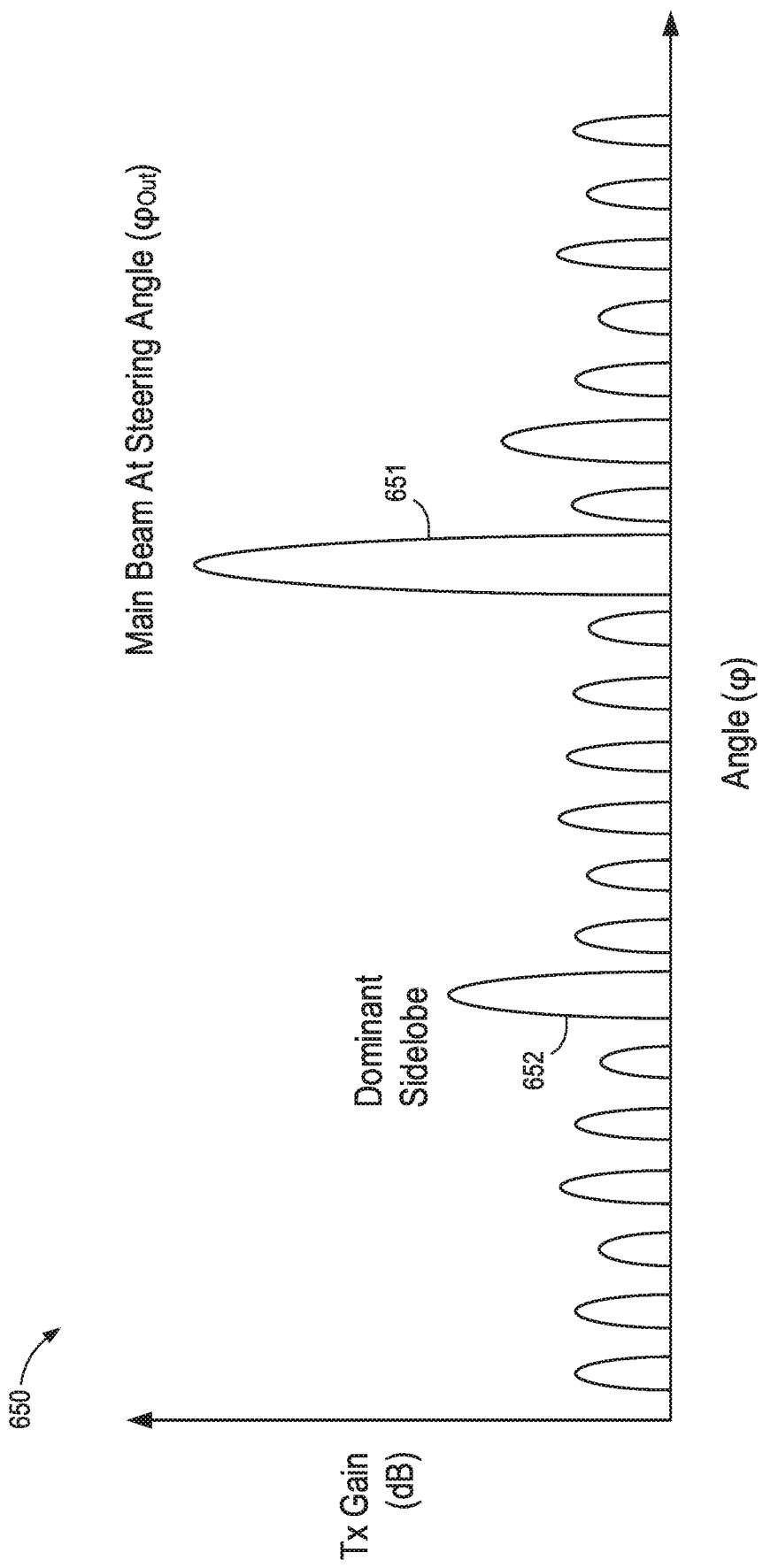
FIG. 6C illustrates a graph of the gain of the transmit metasurface of FIG. 6A, according to one embodiment.
Figure 6E:
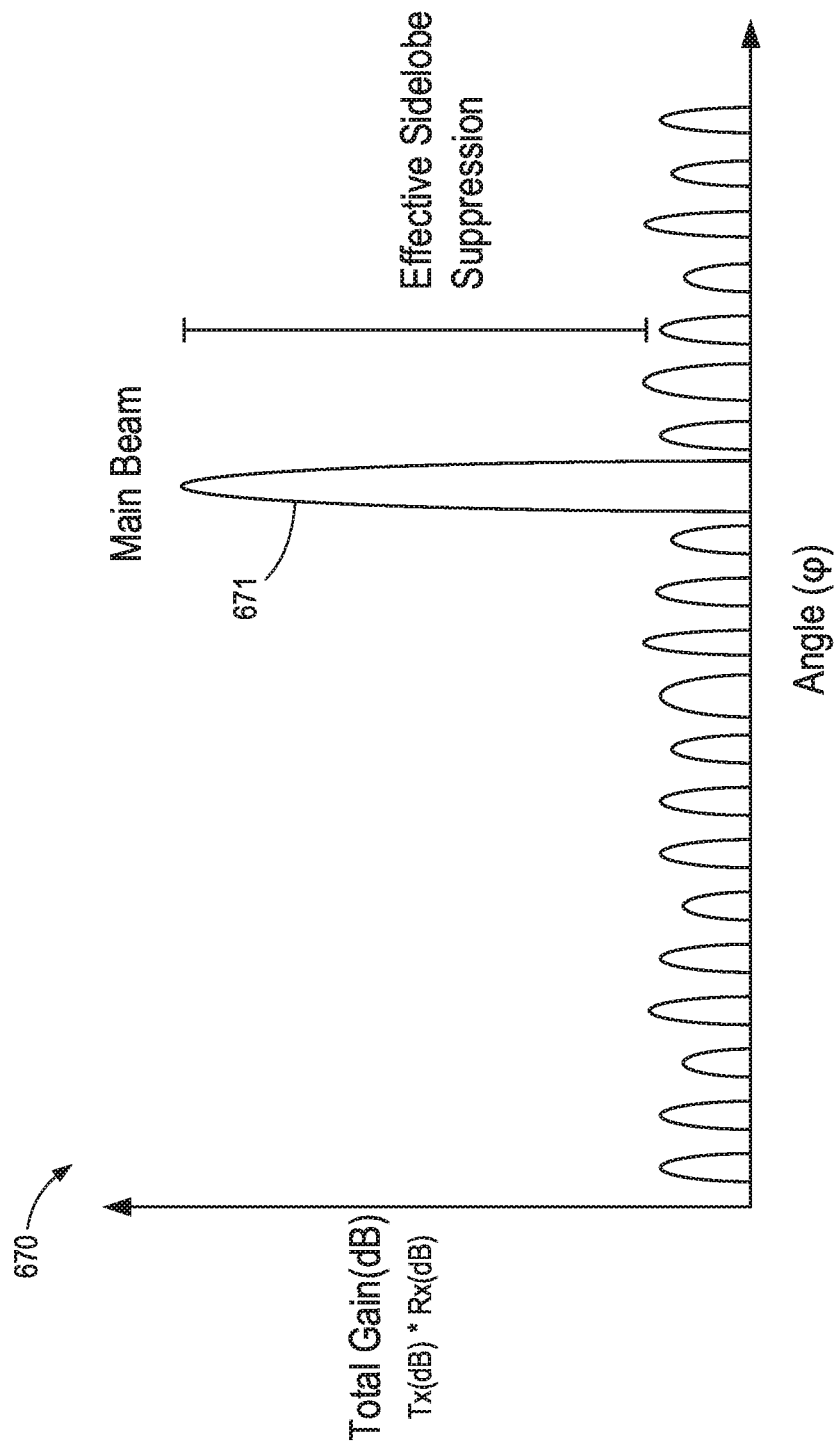
FIG. 6E illustrates a graph of the combined gain of the transmit and receive metasurfaces with offset angles of incidence, according to one embodiment.

FIGS. 6A-6E are comparable to FIGS. 4A and 4B, but differ in that the embodiments in FIGS. 6A-6E utilize offset receive and transmit angles of incidence to generate asymmetric radiation patterns for a given steering angle. As illustrated in FIG. 6E, described in greater detail below, the asymmetric radiation patterns result in a combined gain with an effective sidelobe suppression.

FIG. 6A illustrates a block diagram of a transmit metasurface 616 that receives optical radiation 613 at a first angle of incidence, $\varphi_{inc}$, from a laser 612. The transmit metasurface 616 can be reconfigured or tuned (e.g., by a voltage controller) to transmit beamformed optical radiation at a target steering angle (e.g., one of steering angles 617a-d).

FIG. 6B illustrates a block diagram of a receive metasurface 632 to receive beamformed optical radiation at the target steering angle (e.g., any of steering angles 633a-633d). The received optical radiation is reflected 635 to a detector 636 at a second angle of incidence, $\varphi_{inc}+\Delta\varphi$, that is offset from the first angle of incidence of the transmit metasurface 616 of FIG. 6A, according to one embodiment. As previously noted, the offset angles of incidence contribute to asymmetric radiation patterns for a given steering angle.

FIG. 6C illustrates a transmit graph 650 of the gain of the transmit metasurface 616 of FIG. 6A at various angles for a target steering angle associated with main beam 651. As illustrated, the dominant sidelobe 652 is at an angle on the horizontal-axis approximately halfway between the main beam 651 and the vertical-axis of the graph 650.

FIG. 6D illustrates a receive graph 660 of the gain of the receive metasurface 632 of FIG. 6B, according to one embodiment. The main beam 661 is at the target steering angle, but the dominant sidelobe 663 of the receive metasurface 632 of FIG. 6B is significantly closer to the main beam 661 than the dominant sidelobe 652 of the transmit metasurface 616 of FIG. 6A.

FIG. 6E illustrates a graph 670 of the combined gain of the transmit and receive metasurfaces 616 and 632 of FIGS. 6A and 6B, respectively. The offset angles of incidence of the transmit and receive metasurfaces 616 and 632 result in the asymmetric radiation patterns illustrated in FIGS. 6C and 6D, respectively. Specifically, the angles of the dominant sidelobes of the transmit and receive metasurfaces are at different angles for a given steering angle. Accordingly, the combined gain of the main beam 671 at the steering angle is significantly higher than the combined gain of any of the sidelobes, resulting in an effective sidelobe suppression. A comparison of the graph 670 of FIG. 6E and the graph 470 of FIG. 4B illustrates the sidelobe suppression and improved gain characteristics of the optical transceiver system incorporating transmit and receive metasurfaces with offset angles of incidence.

Figure 7A:
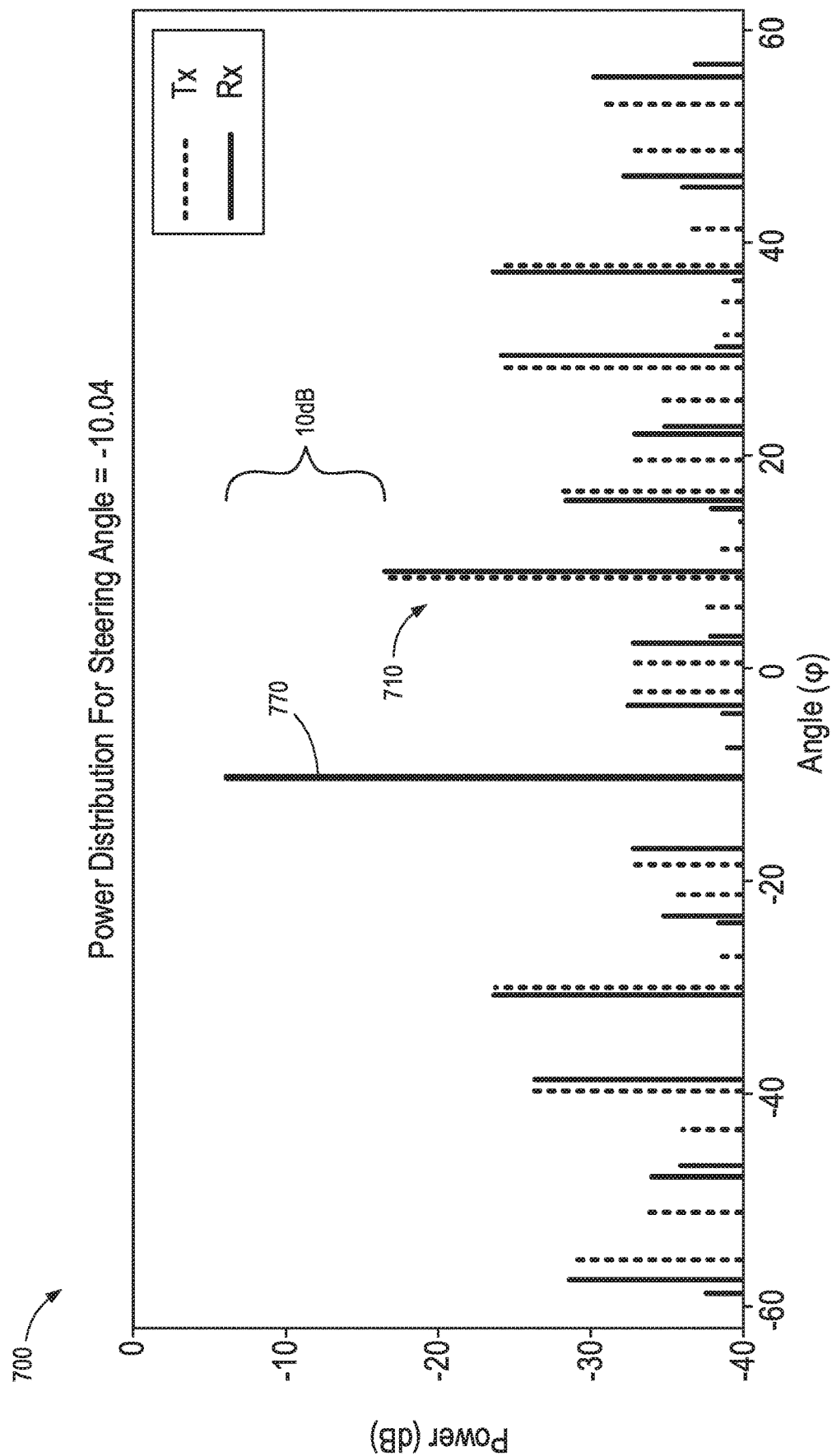
FIG. 7A illustrates the simulated power distribution relative to the azimuth angles of transmit and receive metasurfaces with offset angles of incidence overlaid on the same graph, according to one embodiment.

FIG. 7A illustrates the power level with respect to the azimuth angles of transmit and receive metasurfaces with offset angles of incidence overlaid on the same graph 700, according to one embodiment. As illustrated, the power of the main beams 770 at the steering angle of −10.04 overlaps for the transmit (dashed lines) and receive (solid lines) metasurfaces. However, the power of the various sidelobes, including the dominant sidelobes 710, of each of the transmit and receive metasurfaces are offset with respect to one another. A 10 dB power difference is achieved by each of the transmit and receive metasurfaces between the main beams 770 and the dominant sidelobes 710.

Figure 7B:
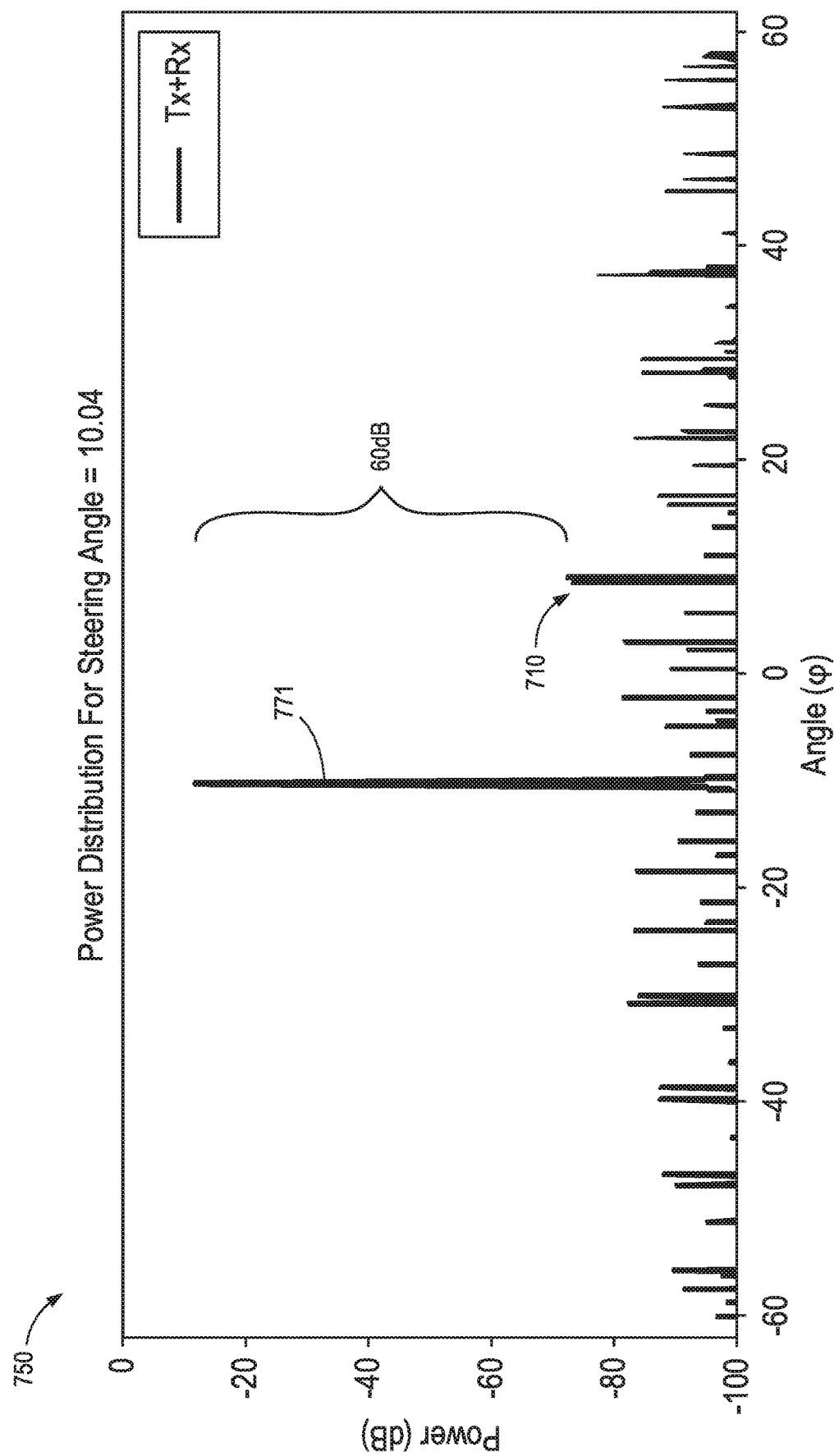
FIG. 7B illustrates a graph of the simulated combined power distribution relative to the steering angle of the transmit and receive metasurfaces with offset angles of incidence, according to one embodiment.

FIG. 7B illustrates a graph 750 of the combined power of the main beam at the steering angle 771 and the power levels of the various sidelobes, including a dominant sidelobe 710, that are not combined because the sidelobes of the transmit and receive metasurfaces are offset with respect to one another. Because the gain of the transmit and receive metasurfaces are combined at the steering angle of the main beam 771, but not at the angles of the various sidelobes, a 60 dB power difference is achieved between the main beam 771 and the offset dominant sidelobes 710.

Figure 8:
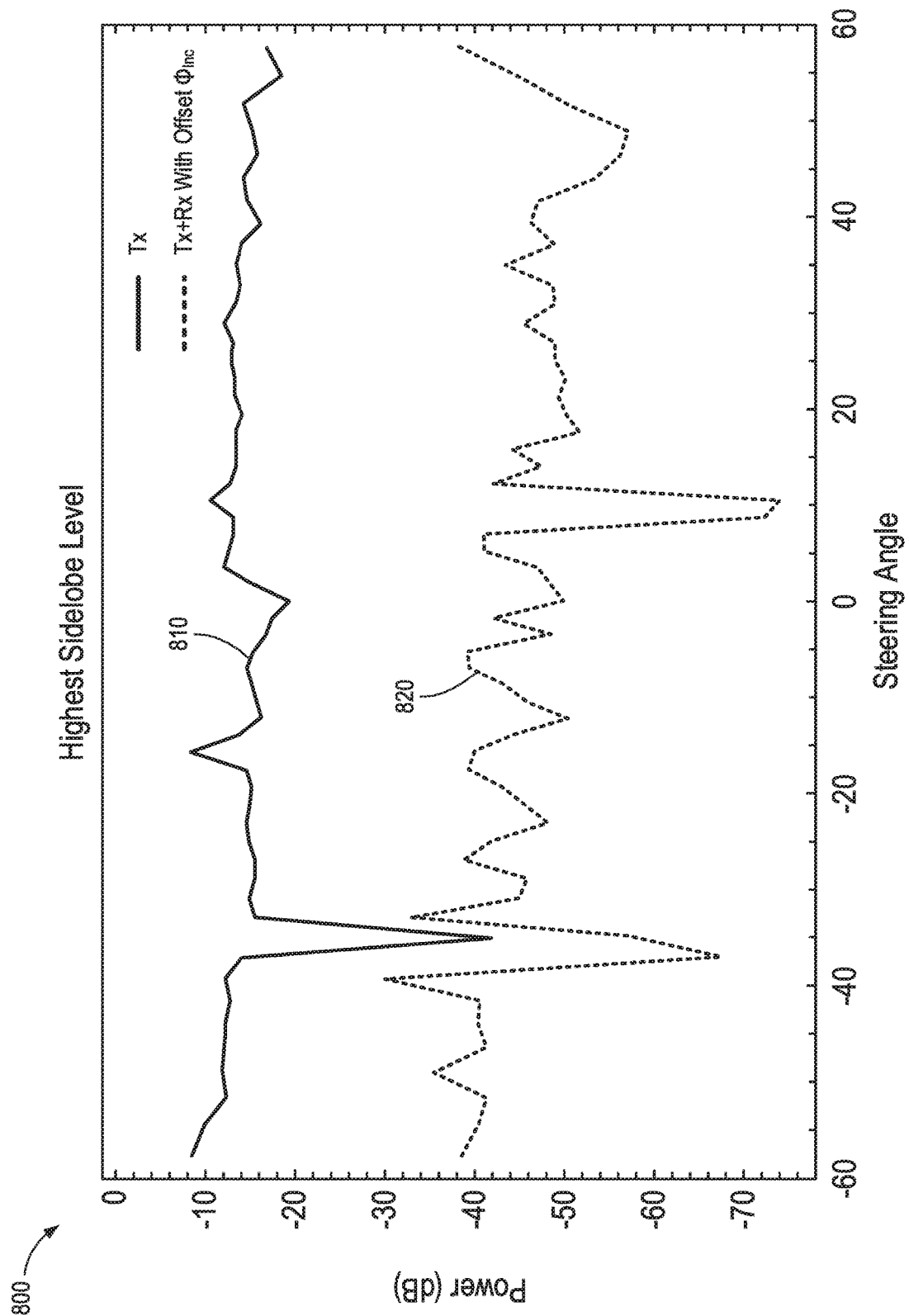
FIG. 8 illustrates an example graph of the simulated gain for a highest sidelobe of a transmit metasurface at various steering angles and the suppressed sidelobe level of the combined transmit and receive metasurfaces for the same steering angles.

FIG. 8 illustrates an example graph 800 of the power level of a highest sidelobe of a transmit metasurface (solid line 810) at various steering angles and the suppressed sidelobe level of the combined transmit and receive metasurfaces (dashed line 820) for the same steering angles. The relative power of the highest sidelobe is reduced by more than 30 dB at many steering angles.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims.

What is claimed is:

1. A system, comprising:
   a first metasurface to steerably transmit incident electromagnetic radiation at a transmit steering angle;
   a radiation source to transmit electromagnetic radiation to the first metasurface at a first angle of incidence with respect to the first metasurface;
   a second metasurface to steerably receive electromagnetic radiation at a receive steering angle corresponding to the transmit steering angle; and
   a detector to detect electromagnetic radiation reflected by the second metasurface from a second angle of incidence with respect to the second metasurface, wherein the first angle of incidence is different than the second angle of incidence.

2. The system of claim 1, wherein the first angle of incidence and the second angle of incidence are selected to offset a dominant sidelobe of the first metasurface with respect to a dominant sidelobe of the second metasurface for each of a plurality of transmit steering angles.

3. The system of claim 1, wherein a difference between the first angle of incidence and the second angle of incidence is selected to generate asymmetric transmit and receive radiation patterns for a given transmit steering angle and corresponding receive steering angle.

4. The system of claim 3, wherein the difference between the first angle of incidence and the second angle of incidence corresponds to one diffraction order of the first and second metasurfaces.

5. The system of claim 1, wherein the first metasurface is configured to steerably transmit incident microwave radiation at the first transmit steering angle, and
   wherein the second metasurface is configured to steerably receive microwave radiation at the receive steering angle.

6. The system of claim 1, wherein the first metasurface is configured to steerably transmit incident optical radiation at the first transmit steering angle, and
   wherein the second metasurface is configured to steerably receive optical radiation at the receive steering angle.

7. The system of claim 1, wherein the first metasurface comprises a radio frequency (RF) metasurface.

8. The system of claim 1, wherein the first metasurface comprises an optically reflective tunable metasurface.

9. The system of claim 8, wherein the first optically reflective tunable metasurface comprises a liquid crystal metasurface (LCM).

10. The system of claim 8, wherein the second optically reflective tunable metasurface comprises a liquid crystal metasurface (LCM).

11. The system of claim 1, wherein radiation source comprises an optical radiation source.

12. The system of claim 11, wherein the optical radiation source comprises a laser to emit light at an operating wavelength.

13. The system of claim 12, wherein the operating wavelength is one of 850 nanometers, 905 nanometers, and 1550 nanometers.

14. The system of claim 12, wherein the laser comprises a collimating lens.

15. The system of claim 1, wherein each of the first and second metasurfaces comprises an optically reflective tunable metasurface.

16. The system of claim 15, wherein each of the first and second optically reflective tunable metasurfaces comprises:
   an array of optical resonant antennas arranged at sub-wavelength intervals on a reflective surface, and
   liquid crystal positioned in optical field regions of each optical resonant antenna in the array.

17. The system of claim 16, wherein a difference between the first angle of incidence and the second angle of incidence corresponds to one diffraction order of the sub-wavelength array of optical resonant antennas.

18. The system of claim 16, further comprising a voltage controller to control the steering angles of the first and second optically reflective LCMs by selectively applying voltage differential bias patterns to the liquid crystal of the respective arrays of optical resonant antennas of each of the first and second optically reflective tunable metasurfaces.

19. A transceiver system, comprising:
a first metasurface to steer incident radiation at a transmit steering angle;
a radiation source to transmit radiation to the first metasurface at a first angle of incidence with respect to the first tunable metasurface;
a second metasurface to steerably receive radiation at a receive steering angle corresponding to the transmit steering angle; and
a detector to detect a power level of the radiation received by the second metasurface that is directed to the detector at a second angle of incidence defined with respect to the second metasurface, wherein the first angle of incidence is different than the second angle of incidence.

20. The system of claim 19, wherein the first and second metasurfaces each comprise a tunable, optically reflective liquid crystal metasurface (LCM) with an array of optical resonant antennas arranged at sub-wavelength intervals on a reflective surface.

21. The system of claim 19, wherein the first angle of incidence and the second angle of incidence are selected to offset a dominant sidelobe of the first metasurface with respect to a dominant sidelobe of the second metasurface for a given transmit steering angle.

22. The system of claim 19, wherein a difference between the first angle of incidence and the second angle of incidence is selected to generate asymmetric transmit and receive radiation patterns for a given transmit steering angle.

23. A transceiver system, comprising:
a first optically reflective tunable liquid crystal metasurface (LCM) to reflect incident light at a transmit steering angle;
a laser to transmit light to the first LCM at a first angle of incidence with respect to the first tunable metasurface;
a second optically reflective tunable LCM to steerably receive light at a receive steering angle corresponding to the transmit steering angle; and
a detector to detect light reflected by the second optically reflective tunable LCM from a second angle of incidence with respect to the second tunable metasurface, wherein the first angle of incidence is different than the second angle of incidence.

24. The system of claim 23, wherein a difference between the first angle of incidence and the second angle of incidence corresponds to one diffraction order of the first and second optically reflective tunable LCMs.

25. The system of claim 23, wherein a difference between the first angle of incidence and the second angle of incidence is selected to generate asymmetric transmit and receive radiation patterns for each transmit steering angle and corresponding receive steering angle.

* * * * *